United States Patent

Maurer et al.

(10) Patent No.: US 10,648,667 B2
(45) Date of Patent: May 12, 2020

(54) COMBUSTION CHAMBER WITH DOUBLE WALL

(71) Applicant: ANSALDO ENERGIA SWITZERLAND AG, Baden (CH)

(72) Inventors: Michael Thomas Maurer, Bad Sackingen (DE); Felix Baumgartner, Waldshut-Tiengen (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 806 days.

(21) Appl. No.: 15/068,100

(22) Filed: Mar. 11, 2016

(65) Prior Publication Data

US 2016/0265776 A1 Sep. 15, 2016

(30) Foreign Application Priority Data

Mar. 12, 2015 (EP) .................................. 15158820

(51) Int. Cl.
*F23R 3/00* (2006.01)
*F02C 7/18* (2006.01)
*F23R 3/06* (2006.01)

(52) U.S. Cl.
CPC ............... *F23R 3/002* (2013.01); *F02C 7/18* (2013.01); *F23R 3/06* (2013.01); *F23R 2900/03043* (2013.01)

(58) Field of Classification Search
CPC .. F23R 3/002; F23R 3/06; F23R 3/005; F23R 3/26; F23R 3/283; F23R 3/286; F23R 2900/03043; F02C 7/141; F02C 7/18; F01D 9/023

USPC ............................................................. 60/782
See application file for complete search history.

(56) References Cited

U.S. PATENT DOCUMENTS

| 4,903,477 | A | 2/1990 | Butt |
| 5,467,815 | A | 11/1995 | Haumann et al. |
| 2007/0180827 | A1 | 8/2007 | Dawson et al. |
| 2009/0282833 | A1* | 11/2009 | Hessler .................. F23R 3/002 60/757 |
| 2010/0071377 | A1* | 3/2010 | Fox .......................... F23R 3/16 60/740 |

OTHER PUBLICATIONS

European Search Report dated Aug. 13, 2015, issued by the European Patent Office in the corresponding European Patent Application No. 15158820.9. (5 pages).

* cited by examiner

*Primary Examiner* — Mark A Laurenzi
*Assistant Examiner* — Loren C Edwards
(74) *Attorney, Agent, or Firm* — Buchanan Ingersoll & Rooney PC

(57) ABSTRACT

A combustion chamber includes a duct wall for guiding a hot gas flow in a hot gas flow path during operation. The duct wall is a double-walled construction including an inner face, an outer face, and a wall cavity. A sleeve at least partly encloses the duct wall for guiding a cooling gas in a cooling channel between the sleeve and the duct wall along the outer surface of the duct wall to an exit end, and the cavity opens to the cooling channel. A gas turbine is disclosing as having such a combustion chamber.

16 Claims, 3 Drawing Sheets

COMBUSTION CHAMBER WITH DOUBLE WALL

TECHNICAL FIELD

The disclosure refers to a cooled combustion chamber wall, more particularly to a combustion chamber with cooled double walls.

BACKGROUND OF THE DISCLOSURE

The thermodynamic efficiency of power generating cycles depends on the maximum temperature of its working fluid which, in the case for example of a gas turbine, is maximum temperature of the hot gas exiting the combustor. The maximum feasible temperature of the hot gas is limited by combustion emissions as well as by the operating temperature limit of the metal parts in contact with this hot gas, and on the ability to cool these parts below the their metal temperature limit. The cooling of the hot gas duct walls forming the hot gas flow paths of advanced heavy duty gas turbines is difficult and currently known cooling methods carry performance penalties, i.e. lead to a reduction in power and efficiency.

Cooling of combustor walls exposed to the hot combustion gases is critical to assure life time of the gas turbine. Cooling sleeves for guiding cooling gas along the walls of combustion chambers have been suggested. For example a combination of sleeves to guide the cooling gas along the combustion chamber with impingement cooling has been disclosed in the EP 13 190 131.6. For impingement cooling of a duct a sleeve is disposed a short distance away from the duct's outer surface. The impingement sleeve contains an array of holes through which compressed cooling gas discharges to generate an array of air jets which impinge on and cool the outer surface of the duct. After impingement the cooling gas flows in a cooling path delimited by the duct and the impingement sleeve towards one end of the duct. The impingement cooling has to be provided from all circumferential directions around the combustion chamber. The supply of sufficient cooling gas to feed the sleeve cooling can be difficult due to space constraints in the plenum surrounding a combustor arrangement in a gas turbine. These space constrains can lead to small cross sections in the supply channels for the sleeve cooling which in turn increase the pressure drop of the cooling arrangement. The increased pressure drop leads to corresponding high cooling gas supply pressure requirements which can be detrimental to the overall performance of the gas turbine.

The EP 2 031 302 A1 describes a combustor wall with cooling channels which integrated into the combustor wall for efficient wall cooling. After cooling the wall the cooling air is discharged into the combustion chamber.

SUMMARY OF THE DISCLOSURE

The object of the present disclosure is to propose a combustion chamber which allows efficient cooling of a duct wall. In this context a combustion chamber can comprise the section of a combustor in which the combustion takes place. It can also comprise the so called transition zone. This is a region downstream of the main combustion zone in which the cross sectional area of the combustor is progressively reduced in the downstream direction between the main combustion zone and the outlet guiding the hot gas flow towards the turbine inlet.

The cooling gas can be air which has been compressed by a compressor of a gas turbine if the combustor is installed in an air breathing gas turbine. It can be any other gas or mixture of gases. For example it can be a mixture of air and flue gases for a gas turbine with flue gas recirculation into the compressor inlet. The cooling gas can for example also be carbon dioxide for a semi-closed oxy-fuel gas turbine cycle with carbon dioxide as working medium into which fuel and oxygen are injected in the combustion chamber for combustion.

The disclosed combustion chamber comprises a duct wall for guiding a hot gas flow in a hot gas flow path during operation. The duct wall is a double-walled construction including an inner face, an outer face, and a wall cavity extending from a cavity inlet to a cavity outlet along the duct wall. Along the duct wall means for example that the cavity is extending substantially parallel to the surface of the duct wall and remains inside the wall below the surface. The combustion chamber further comprises a sleeve which is at least partly enclosing the duct wall and guides a cooling gas in a cooling channel between the sleeve and the duct wall along the outer surface of the duct wall to an exit end. The cavity outlet opens to the cooling channel. During operation cooling gas is feed to the wall cavity through the cavity inlet. After passing through the wall cavity the cooling gas is discharged from the cavity outlet into the cooling channel. The cooling gas further cools the duct wall as it flows through the cooling channel towards the exit end of the cooling channel.

The double wall can for example be cast, be manufactured by SLM (Selective Laser Melting), or manufactured from wall layers which are brazed or welded together.

According to a further embodiment of the combustion chamber the sleeve comprises a plurality of apertures surrounding the duct wall which are spaced at a distance therefrom such that cooling gas injected from a compressed gas plenum through the apertures impinges on the duct wall during operation. After impingement cooling of the duct wall the cooling gas flows as cross flow towards the exit end of the cooling channel. According to yet a further embodiment of the combustion chamber the cavity inlet and the apertures for impingement cooling of the duct wall are connected to the same compressed gas plenum. Thus, cooling gas from one plenum as cooling gas source can be used to cool the duct wall by impingement cooling in addition to cooling by heat transfer to cooling gas flowing through the wall cavities. Both cooling flows can thus be reused in the cooling channel to further cool the duct wall.

In one exemplary embodiment of the combustion chamber the cooling cavities extend in a direction normal to an axial extension of the combustor circumferentially around the duct wall.

In another embodiment the duct wall has a rectangular, trapezoidal, elliptical, or circular cross section with a first cavity inlet on one side and a second cavity inlet on an opposite side. For a rectangular or trapezoidal cross section a side is a flat side wall. For a circular or elliptical cross section a side can be a section of the circle, respectively ellipse which covers for example an angle between 30° and 90° or for example up to 150°. In this embodiment a first cavity outlet is arranged in a wall section connecting the first and second cavity inlet on one side of the hot gas flow and a second cavity outlet in a wall section connecting the first and second cavity inlet on an opposite side of the hot gas flow. Here, a wall cavity extends from the cavity inlet on one side to the cavity outlet a neighboring side.

Alternatively or in combination the duct wall has a cavity inlet on one side and a cavity outlet on an opposite side. Here, a wall cavity extends from the cavity inlet on one side to the cavity outlet on the opposite side.

In a further embodiment of the combustion chamber the cavity inlet is arranged next to a joint at which two sections of the duct wall are connected. A duct wall can consist of different sections. For manufacturing and stability reasons it can be difficult to configure a region in which sections of a duct wall are joined or connected to each other as a double wall. A joint can for example be weld or flange. To cool the joint region it is best to introduce the cooling gas closely to the joint through a cavity inlet next to the joint. Next to the joint in this context can for example be within a distance in the order of the thickness of the duct wall, more specifically for example . one to five times the wall thickness. In the cavity inlet the cooling gas flow direction typically can change from a direction inclined to or normal to the duct wall surface to a direction tangential to the duct wall surface. This change in flow direction leads to increased heat transfer needed to cool the joint region. Alternatively or in combination the cavity outlet can be arranged next to the joint. Also at the outlet the flow direction is typically changed (e.g. from direction tangential to the duct wall surface to inclined or normal to the surface) which can lead to an increased heat transfer.

In yet another configuration a first section of the duct wall is configured as a double wall comprising the wall cavity and a second section is configured as a single wall. The second section is extending below the sleeve for cooling.

Besides the combustion chamber a gas turbine comprising a compressor, a turbine and a combustor with a plurality of the above described combustion chambers is an object of the disclosure.

Specifically such a gas turbine can for example comprise a plurality of combustion chambers with a duct wall for guiding a hot gas flow in a hot gas flow path during operation wherein the duct wall is a double-walled construction including an inner face, an outer face, and a wall cavity extending from a cavity inlet to a cavity outlet along the duct wall. The combustion chamber further comprises a sleeve which is at least partly enclosing the duct wall and guides a cooling gas in a cooling channel between the sleeve and the duct wall along the outer surface of the duct wall to an exit end. The cavity outlet opens to the cooling channel. During operation cooling gas is feed to the wall cavity through the cavity inlet. After passing through the wall cavity the cooling gas is discharged from the cavity outlet into the cooling channel. The cooling gas further cools the duct wall as it flows through the cooling channel towards the exit end of the cooling channel.

According to a further embodiment of the combustion chamber of this gas turbine has a sleeve comprising a plurality of apertures surrounding the duct wall, which are spaced at a distance therefrom such that cooling gas injected from a compressed gas plenum through the apertures impinges on the duct wall during operation. After impingement cooling of the duct wall the cooling gas flows as cross flow towards the exit end of the cooling channel. Typically the exit end of the cooling channel is arranged at the upstream side of the combustion chamber relative to the hot gas flow direction of the hot gases inside the combustion chamber during operation.

According to yet a further embodiment the gas turbine has compressed gas plenum, e.g. the compressor plenum, and both the cavity inlet and the apertures for impingement cooling of the duct wall are connected to this plenum. Thus, cooling gas from one plenum as cooling gas source can be used to cool the duct wall by impingement cooling in addition to heat transfer to cooling gas flowing through the wall cavities. Both cooling flows can be reused in the cooling channel to further cool the duct wall.

In a further embodiment the exit end of the cooling channel is connected to a burner of the gas turbine for introduction of the cooling gas into the burner during operation. Thus the cooling gas will be reused as a combustion gas after it has been used for cooling of the combustion chamber. This reuse of the cooling gas which is heated due to the heat pick up during cooling of the combustion chamber increases efficiency and reduces the NOx emissions for a given hot gas temperature because the cooling gas is not bypassed around the combustion process.

In a specific embodiment a plurality of combustion chambers is circumferentially arranged around the axis of the gas turbine. A section of the duct wall of two neighboring combustion chambers facing each other is configured as a double wall with a wall cavity. The sleeve is arranged above a section of the duct wall facing towards the axis of the gas turbine. Alternatively or in combination the sleeve the sleeve is arranged above a section of the duct wall facing away from the axis of the gas turbine. The section respective sections of the duct wall of two neighboring combustion chambers facing each other are free of a sleeve and cooling channel. Therefore the circumferential distance between neighboring combustion chambers can be reduced. For a given hot gas flow cross section the diameter on which the combustion chambers are arranged can thereby be reduced. Consequently the combustor casing and the whole gas turbine diameter can be reduced, saving material and cost. Alternatively or in combination the reduced space requirement of the double wall arrangement can be used to increase the free area between the walls of neighboring combustion chambers turs reducing the pressure loss of a gas flow between these. The space can also be used for additional installations such as a Helmholtz damper.

In an alternative embodiment a plurality of combustion chambers are circumferentially arranged around the axis of the gas turbine and the cavity inlet is arranged on a section the duct wall which is facing a neighboring combustion chamber. In this arrangement a sleeve is arranged above a section of the duct wall facing towards the axis of the gas turbine and/or in that a sleeve is arranged above a section of the duct wall facing away from the axis of the gas turbine. Also in this embodiment no space is needed for a sleeve or impingement cooling between neighboring combustion chambers allowing a reduced distance between combustion chambers compared to an arrangement where a sleeve and in particular where impingement cooling is applied on these sides. The arrangement of the cavity inlets at the sides provides the wall cavities with the coldest available cooling gas in the side sections which have no additional cooling by the cooling channel and are not impingement cooled.

Besides the combustion chamber and gas turbine a method for cooling such a combustion chamber is an object of the disclosure. According to the method a cooling fluid is feed into a cavity inlet of duct wall having a double-walled construction including an inner face, an outer face, and a wall cavity extending from the cavity inlet to a cavity outlet along the duct wall, such that the cooling gas flows through the wall cavity for cooling the duct wall. The cooling gas is then discharged into a cooling channel through the cavity outlet for further convective cooling of the duct wall. The cooling channel is delimited by the duct wall and a sleeve which is at least partly enclosing the duct wall for guiding a cooling gas along the outer surface of the duct wall.

According to a further embodiment of the method cooling gas is injected through a plurality of apertures in the surrounding sleeve, which is spaced at a distance from the duct wall such that cooling gas from a compressed gas plenum which passes through the apertures impinges on the duct wall. After impingement the cooling gas flows as cross flow owards an exit end of the cooling channel.

According to another embodiment of the method the cooling gas is feed from one compressed gas plenum to the wall cavity through the cavity inlet and discharges to the cooling channel from the cavity outlet. Further, cooling gas from the same cooling plenum is injected through through the apertures in the sleeve, impinges on the duct wall, and flows as cross flow thrrough the same cooling channe as the cooling gas which discharges from the cavity outled.

The proposed combustion chamber allows an efficient cooling scheme which can be easily adjusted according to the effective cooling requirements during operation and adjusted to additionally cool local hot sports. The disclosure also refers to a method for designing a combustion chamber taking into account this flexibility. The method comprises the following steps:

Design the wall cavities of the combustion chamber for a specific cooling requirement. The cooling requirement can for example be the result of a numerical simulation of the combustion chamber operation and heat transfer.

Operate the combustion chamber under design conditions, and measure at the combustor wall temperature of at least one wall section. Add at least one aperture in the cooling sleeve for local additional impingement cooling if the measured temperature exceeds a limit temperature. The limit temperature can for example be a critical material temperature above which the life time of the combustor may be compromised.

The proposed cooling design also allows for an easy adjustment of the cooling capacity according to different operating regimes of the gas turbine.

For long service intervals the number of impingement cooing holes can be increased relative to the number of impingement cooling holes for a standard design. The increased number of cooling holes leads to a reduction in the combustion chamber wall which can allow long service intervals.

For maximum gas turbine efficiency and power the number of impingement cooing holes can be reduced relative to the number of impingement cooling holes for a standard design. The reduced number of cooling holes reduces the gas flow through the cooling system and can reduce the required pressure loss to feed the cooling gas through the cooling system and back into the burner. Thus the power and efficiency can be increased.

The combustion chamber can for example be an annular combustion or a combustion chamber of a can combustor. It can also be a combustion chamber of a silo combustor. The combustion chamber can for example be the second combustor of a sequential combustor arrangement. A sequential combustor arrangement can comprise a first combustor with a first burner for admitting fuel into a combustor inlet gas during operation and a first combustion chamber, a dilution gas admixer for admixing a dilution gas to the first combustor combustion products leaving the first combustion chamber, a second burner for admixing fuel, and a second combustion chamber. Such a sequential combustor arrangement is known form the EP 14 150 737.6 which is incooperated by reference.

Different burner types can be used. For the first combustor so called EV burner as known for example from the EP 0 321 809 or AEV burners as known for example from the DE 195 47 913 can for example be used. Also a BEV burner comprising a swirl chamber as described in the European Patent application EP 2 722 591, which is incorporated by reference, can be used. In a can architecture a single or a multiple burner arrangement per can combustor can be used. Further, a flamesheet combustor as described in U.S. 2004/0211186, which is incorporated by reference, can be used as first combustor.

BRIEF DESCRIPTION OF THE DRAWINGS

The disclosure, its nature as well as its advantages, shall be described in more detail below with the aid of the accompanying schematic drawings.

Referring to the drawings.

EMBODIMENTS OF THE DISCLOSURE

Figure 1:
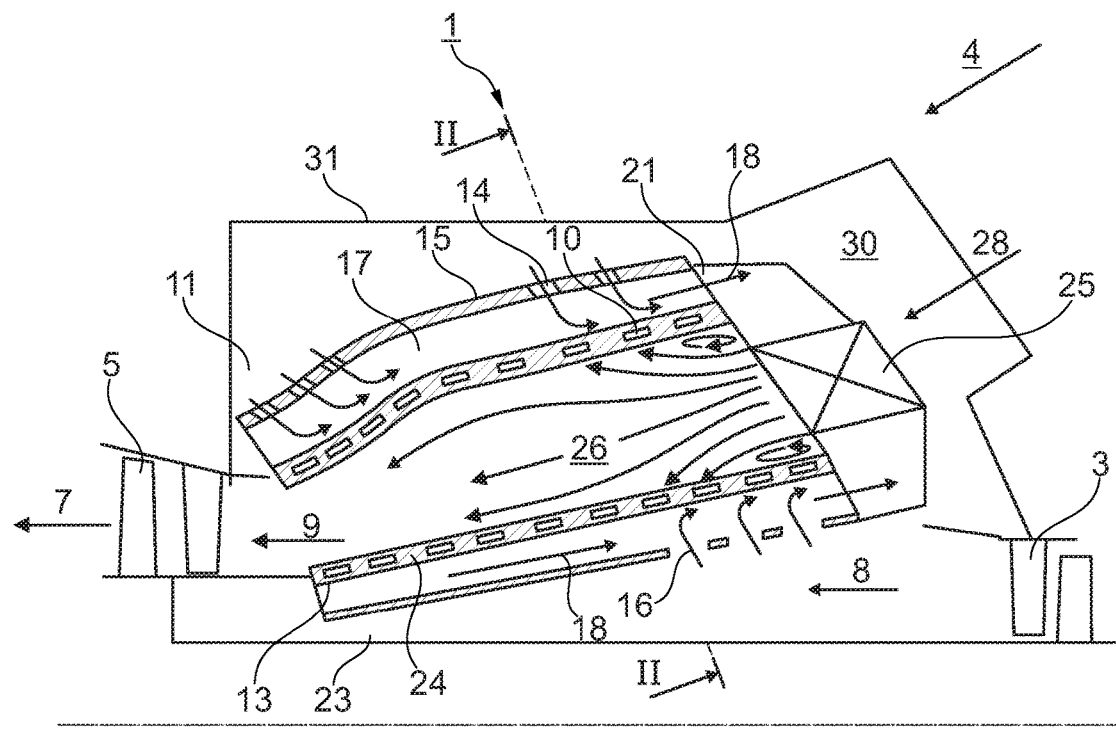
FIG. 1 shows a gas turbine with a compressor, a combustion chamber, and a turbine.

FIG. 1 shows a gas turbine 1 with an impingement cooled combustor 4. It comprises a compressor 3, a combustor 4, and a turbine 5.

Intake air is compressed to compressed gas 8 by the compressor 3. Fuel 28 is burned with the compressed gas 8 in the combustor 4 to generate a hot gas flow 9. The hot gas 9 is expanded in the turbine 5 generating mechanical work.

The combustor 4 is housed in a combustor casing 31. The compressed gas 8 leaving the compressor 3 passes through a diffusor for at least partly recovering the dynamic pressure of the gas leaving the compressor 3. Compressed gas 8 leaving the diffusor flows through a compressor plenum 30. From the compressor plenum 30 part of the compressed gas flows directly into the burner 25 for mixing with fuel 28 and subsequent combustion in the combustion chamber 26. Part of compressed gas 8 is first used as cooling gas 16 to cool the duct wall 10 of the combustion chamber 26. Typically also other cooling gas flows are taken from the compressor plenum 30 for cooling of the burner 25 and of the turbine 5.

Typically, the gas turbine system includes a generator which is coupled to a shaft 2 of the gas turbine 1. The gas turbine 1 further comprises a cooling system for the turbine 5, which is not shown, as it is not the subject of this disclosure.

Exhaust gas 7 leaves the turbine 5. The remaining heat is typically used in a subsequent water steam cycle, which is also not shown here.

FIG. 1 shows a combustor 4 with an impingement cooling arrangement for cooling the duct wall 10. The combustor 4 comprises a burner 25 at the upstream end and a combustion chamber 26 extending from the burner to the downstream end. The combustion chamber 26 is delimited to the sides by the duct wall 10. For the impingement cooling of the duct wall 10 a sleeve 15 comprising apertures 14 is arranged around the combustion chamber 26. Cooling gas 16 is injected through the apertures and 16 impinges on the duct wall 10. After impingement it flows in the cooling flow path 17 formed by the duct wall 10 and the sleeve 15 towards the upstream end of the combustion chamber 26 in counter flow to the hot gas flow inside the combustion chamber 26. After cooling the duct wall 10 the cooling gas 16 can flow into the burner (not shown in the cross section), respectively into the combustion chamber 26 at the upstream end of the hot gas flow path to be further used as combustion gas.

At least part of the duct wall 10 is configured as a double-walled construction for additional cooing. The double walled duct wall has an inner face 11 facing the hot gas flow path and an outer face 12 facing towards the compressor plenum. A wall cavity is extending from a cavity inlet to a cavity outlet (see FIGS. 2 to 4 for the cavity inlets and outlets) along the duct wall 10 between the inner face 11 and outer face 12. During operation cooling gas flows through the wall cavities 13. After cooling the duct wall 10 cooling gas is discharged from the wall cavities into the cooling channel 17 delimited by the cooling sleeve 15 and the outer face 12 of the duct wall 10. Together with the cooling gas which was used for impingement cooling, the cooling gas discharged from the wall cavities flows towards the upstream end of the combustion chamber 26 for further use in the burner 25, respectively in the combustion chamber 26. In this example the wall cavity 13 is split into a plurality of wall cavities 13 by ribs 24 which connect the outer face 12 with the inner face 11. Also pins can be used to connect the outer face 12 with the inner face 11.

Figure 2:
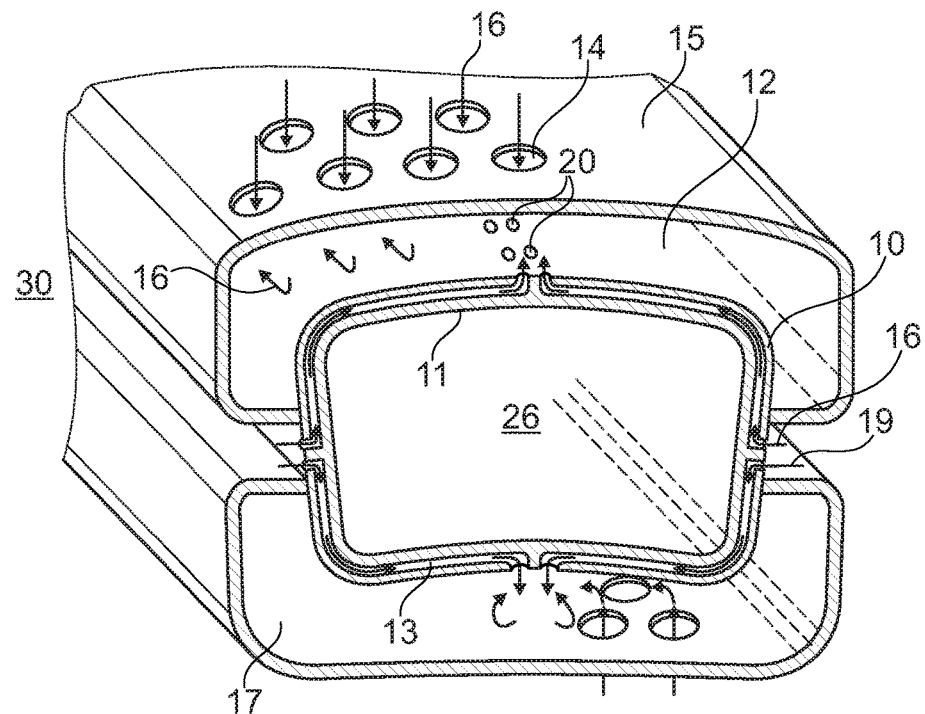
FIG. 2 shows a cross section II-II of a combustion chamber of FIG. 1.

FIG. 2 shows a perspective view of the cross section II-II of the combustion chambers 26 of FIG. 1 as an example of a combustion chamber 26 with a double-walled construction. The duct wall 10 is configured as a double-walled construction with an inner face 11, an outer face 12, and a wall cavity 13 extending from a cavity inlet 19 to a cavity outlet 20 along the duct wall 10. In this example with a rectangular cross section four wall cavities 13 are arranged in the cross section. Each wall cavity is extending from a cavity inlet 19 arranged on the side wall of the combustion chamber to a cavity outlet 20 arranged on a top wall, respectively bottom wall of the combustion chamber 26. The cooling gas 16 is feed to the cavity inlets 19 from the compressor plenum 30 surrounding the combustion chamber 26. An upper section and a lower section of the duct wall 10 is enclosed by a sleeve 15 forming a cooling channel 17 there between. The cavity outlet 20 opens to the cooling channel 17 and the cooling gas 16 discharged from the cavity outlets 20 flows towards an exit end (not shown in the cross section) of the cooling channel 17.

For the impingement cooling of the duct wall 10 the sleeve 15 comprises apertures 14. Cooling gas 16 is injected through the apertures and 16 impinges on the duct wall 10. After impingement it flows in the cooling channel 17 towards the upstream end of the combustion chamber (not shown). In this example apertures 14 are arranged above the top and bottom sides of the duct wall 10.

Figure 3:
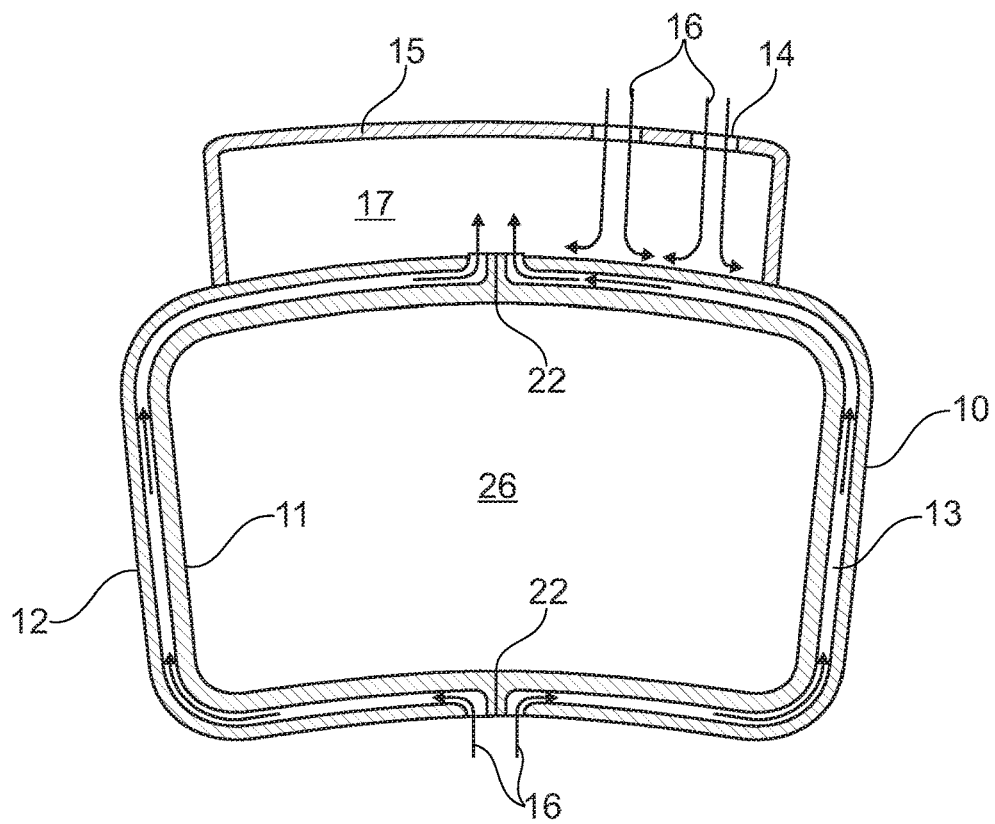
FIG. 3 shows an example of a cross section of a combustion chamber with a cooling sleeve on one side.

FIG. 3 shows another example of a cross section of a combustion chamber 26 with a double-walled construction. The duct wall 10 is configured as a double-walled construction with an inner face 11, an outer face 12, and a wall cavity 13 extending from a cavity inlet 19 to a cavity outlet 20 along the duct wall 10. In this example with a rectangular cross section two wall cavities 13 are arranged in the cross section. Each wall cavity 13 is extending from a cavity inlet 19 arranged at the center of bottom side wall of the combustion chamber to a cavity outlet 20 arranged at the center of a top wall. One wall cavity 13 spans around the left half of the duct wall 10 and the other wall cavity 13 spans around the right half of the duct wall 10. The cooling gas 16 is feed to the cavity inlets 19 from the compressor plenum 30 surrounding the combustion chamber 26. An upper section of the duct wall 10 is enclosed by a sleeve 15 forming a cooling channel 17 there between. In this example the top wall of the duct wall 10 is practically enclosed by the sleeve 15. The cavity outlet 20 opens to the cooling channel 17 and the cooling gas 16 discharged from the cavity outlets 20 flows towards an exit end (not shown in the cross section) of the cooling channel 17.

For the impingement cooling of the duct wall 10 the sleeve 15 comprises apertures 14. Cooling gas 16 is injected through the apertures and 16 impinges on the duct wall 10. After impingement it flows in the cooling channel 17 towards the upstream end of the combustion chamber (not shown). In this example apertures 14 are arranged above the top side of the duct wall 10.

In this example the duct wall 10 comprises a left and a right section. Both sections are connected by an upper joint 22 and a lower joint 27. The cavity inlets 19 are arranged on both sides of the lower joint 27. The cavity outlets 20 are arranged on both sides of the upper joint 22. The joint can for example be a weld.

Figure 4:
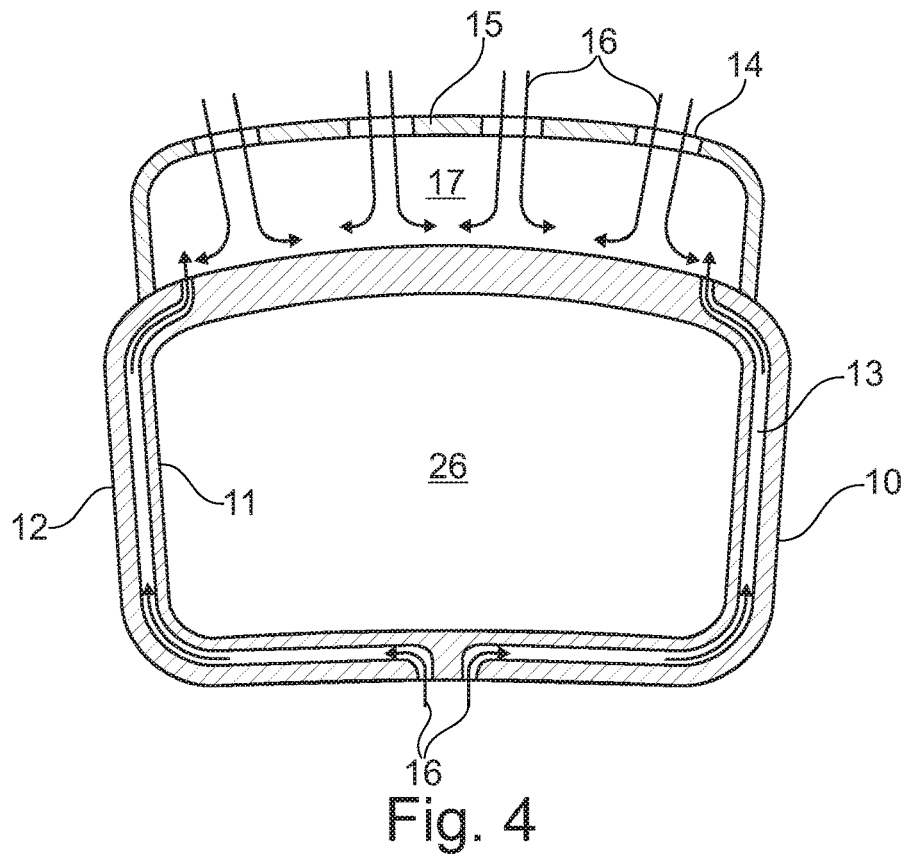
FIG. 4 shows another an example of a cross section of a combustion chamber with a cooling sleeve wherein one section of the combustion chamber wall is configured as double wall and another section as an impingement cooled single wall.

FIG. 4 shows another example of a cross section of a combustion chamber 26 with a double-walled construction. The example of FIG. 4 is based on the example of FIG. 3. In contrast to the example of FIG. 3 the top section of the duct wall 10 is single-walled. The cavity outlets 20 are arranged towards the left, respectively the right side of the top section. The top section extending between the cavity outlets 20 is impingement cooled.

Figure 5:
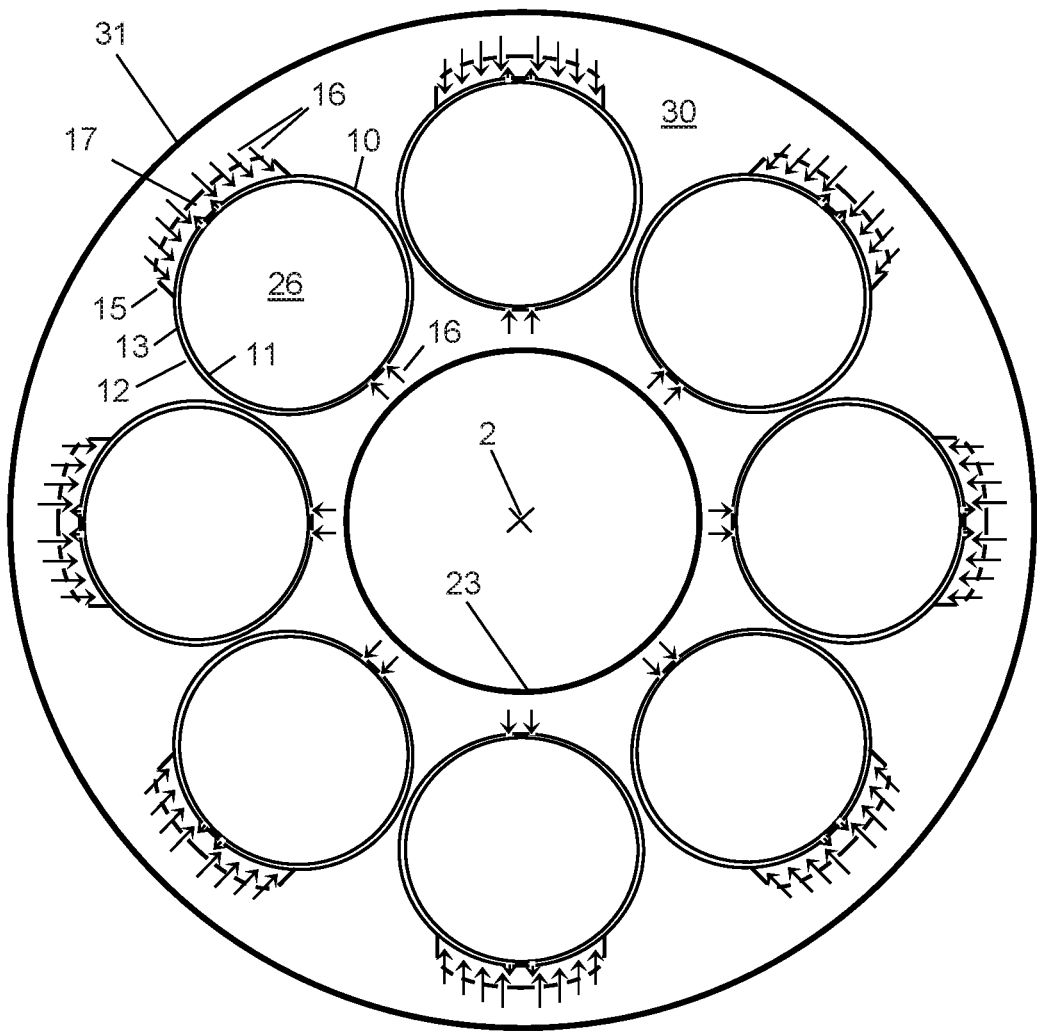
FIG. 5 shows a cross section of gas turbine having a combustion arrangement with an array of double-walled combustion chambers circumferentially arranged around the axis of the gas turbine.

FIG. 5 shows a cross section of gas turbine having a combustion arrangement with an array of double-walled combustion chambers 26 circumferentially arranged around the axis 2 of the gas turbine. Each combustion chamber 26 has a cylindrical duct wall 10. The duct walls 10 have an inner face 11 and outer face 12 and are feed with cooling gas on a side facing towards the axis 2 of the gas turbine from a compressor plenum 30 which is delimited by the rotor cover 23 and the combustor casing 31. The side of each combustor facing away from the axis 2 is enclosed by a sleeve 15 delimiting a cooling channel 17 between the duct wall 10 and the sleeve 15. After cooling the duct wall 10 cooling gas 16 discharges from the double walled duct wall 10 into the cooling channel 17 flows towards an exit end (not shown in the cross section) of the cooling channel 17.

The outwards facing section of the duct wall 10 below the sleeve 15 is further impingement cooled by cooling gas 16 injected through apertures 14. After impingement cooling gas 16 flows in the cooling channel 17 towards the upstream end of the combustion chamber (not shown).

LIST OF DESIGNATIONS

1 Gas Turbine
2 Axis
3 Compressor
4 Combustor
5 Turbine
7 Exhaust Gas
8 Compressed gas
9 Hot gas flow 10 Duct wall
11 Inner face
12 Outer face
13 Wall cavity
14 Aperture
15 Sleeve
16 Cooling gas
17 Cooling channel
18 Convective liner cooling
19 Cavity inlet
20 Cavity outlet
21 Exit end
22 Inner joint
23 Rotor cover
24 Rib
25 Burner
26 Combustion chamber
27 Outer joint
28 Fuel
30 Compressor plenum
31 Combustor casing

The invention claimed is:

1. A combustion chamber, comprising:
a duct wall for guiding a hot gas flow in a hot gas flow path during operation, wherein the duct wall is a double-walled construction including an inner face, an outer face, and a plurality of wall cavities, each wall cavity extending from a cavity inlet to a cavity outlet along the duct wall; and
a sleeve at least partly enclosing the duct wall for guiding a cooling gas in a cooling channel between the sleeve and the duct wall along the outer face of the duct wall to an exit end, the cavity outlet of each wall cavity opening to the cooling channel,
wherein each wall cavity extends in a direction normal to an axial extension of the combustion chamber circumferentially around the duct wall from the cavity inlet to the cavity outlet, each wall cavity being separated from an adjacent wall cavity by a connecting piece which connects the outer face and the inner face,
wherein a first portion of the duct wall at a position along the axial extension of the combustion chamber is configured as a double wall which includes each wall cavity and a second portion of the duct wall at the position along the axial extension of the combustion chamber is configured as a single wall wherein the sleeve encloses the second portion and the sleeve does not enclose the first portion.

2. The combustion chamber according to claim 1, wherein the sleeve comprises:
a plurality of apertures surrounding the duct wall, and spaced at a distance therefrom such that the cooling gas injected from a compressed gas plenum through the apertures during operation impinges on the duct wall and flows as cross flow towards the exit end of the cooling channel.

3. The combustion chamber according to claim 2, wherein each cavity inlet is connected to the compressed gas plenum for impingement cooling of the duct wall.

4. The combustion chamber according to claim 2, comprising:
wherein the plurality of wall cavities are specified for a specific cooling requirement, the combustion chamber being configured to include at least one additional aperture for additional impingement cooling when a limit temperature of a section of the duct wall is exceeded during a combustion chamber design test operation.

5. The combustion chamber according to claim 1, wherein the duct wall has a rectangular, trapezoidal, elliptical, or circular cross section with a first cavity inlet on one side and a second cavity inlet on an opposite side and a first cavity outlet in a wall section connecting the first and second cavity inlet on one side of the hot gas flow and a second cavity outlet in a wall section connecting the first and second cavity inlet on an opposite side of the hot gas flow.

6. The combustion chamber according to claim 1, wherein each cavity inlet and/or each cavity outlet is arranged next to a joint at which two sections of the duct wall are connected.

7. A gas turbine with at least one compressor, and at least one turbine, wherein the gas turbine comprises:
at least one combustion chamber according to claim 1.

8. The gas turbine according to claim 7, wherein the exit end of the cooling channel is connected to a burner of the gas turbine for introducing the cooling gas into the burner during operation.

9. The gas turbine according to claim 7, wherein a plurality of the combustion chambers are circumferentially arranged around an axis of the gas turbine, and a section of the duct wall of two adjacent combustion chambers facing each other is configured as a double wall with each wall cavity, and each sleeve is arranged above a section of the duct wall facing towards the axis of the gas turbine.

10. The gas turbine according to claim 7, wherein a plurality of the combustion chambers are circumferentially arranged around an axis of the gas turbine, each cavity inlet being arranged on a section of the duct wall of two adjacent combustion chambers facing each other, and each sleeve being arranged above a section of the duct wall facing towards the axis of the gas turbine.

11. The gas turbine according to claim 7, wherein a plurality of the combustion chambers are circumferentially arranged around an axis of the gas turbine, and a section of the duct wall of two adjacent combustion chambers facing each other is configured as a double wall with the plurality of wall cavities, and each sleeve is arranged above a section of the duct wall facing away from the axis of the gas turbine.

12. The gas turbine according to claim 7, wherein a plurality of the combustion chambers are circumferentially arranged around an axis of the gas turbine, each cavity inlet being arranged on a section of the duct wall of two adjacent combustion chambers facing each other, and each sleeve being arranged above a section of the duct wall facing away from the axis of the gas turbine.

13. A method for cooling the combustion chamber according to claim 1, comprising:
feeding the cooling gas into each cavity inlet, through the plurality of wall cavities for cooling the duct wall; and
discharging the cooling gas into the cooling channel through each cavity outlet for further convective cooling of the duct wall.

14. The method for cooling the combustion chamber according to claim 13, wherein the cooling gas is injected through a plurality of apertures surrounding the sleeve which is spaced at a distance from duct wall such that the cooling gas from a compressed gas plenum passing through the apertures, impinges on the duct wall, and flows as cross flow towards the exit end of the cooling channel.

15. The method for cooling the combustion chamber according to claim 14, comprising:

feeding the cooling gas from the compressed gas plenum to the wall cavity through each cavity inlet and discharging the cooling gas to the cooling channel from each cavity outlet; and injecting the cooling gas from the compressed gas plenum through the apertures, to impinge on the duct wall, and flow as the cross flow through the same cooling channel as the cooling gas which discharges from each cavity outlet.

16. The combustion chamber according to claim 1, wherein the duct wall has each cavity inlet on one side and each cavity outlet on an opposite side with the each wall cavity extending from each cavity inlet on one side to each cavity outlet on the opposite side.

* * * * *